United States Patent [19]

Mueller

[11] Patent Number: 4,965,136

[45] Date of Patent: Oct. 23, 1990

[54] EXTRUDED VINYLIDENE CHLORIDE COPOLYMER FLEXIBLE PACKAGING FILM

[75] Inventor: Walter B. Mueller, Inman, S.C.

[73] Assignee: W. R. Grace & Co.-Conn., Duncan, S.C.

[21] Appl. No.: 232,740

[22] Filed: Aug. 16, 1988

[51] Int. Cl.$^5$ .................. B32B 27/38; B32B 13/12; B29D 9/00

[52] U.S. Cl. .................. 428/414; 428/451; 428/518; 428/910; 428/516; 428/476.1; 428/313.5; 524/730; 524/109; 524/141; 524/417; 264/514; 426/127; 525/104

[58] Field of Search ............... 428/518, 910, 451, 414, 428/35.4, 36.7

[56] References Cited

U.S. PATENT DOCUMENTS

| | | | |
|---|---|---|---|
| 2,205,449 | 6/1940 | Wiley | 18/48 |
| 2,320,112 | 5/1943 | Wiley | 18/48 |
| 3,524,795 | 8/1970 | Peterson | 161/165 |
| 3,741,253 | 6/1973 | Brax et al. | 138/137 |
| 4,112,181 | 9/1978 | Baird, Jr. et al. | 428/336 |
| 4,320,175 | 3/1982 | Hisazumi et al. | 428/518 |
| 4,360,612 | 11/1982 | Trumbull et al. | 523/351 |
| 4,401,788 | 8/1983 | Hiyoshi et al. | 524/714 |
| 4,418,168 | 11/1983 | Johnson | 524/109 |
| 4,686,148 | 8/1987 | Havens | 428/520 |
| 4,714,638 | 12/1987 | Lustig et al. | 428/35 |
| 4,737,391 | 4/1988 | Lustig et al. | 428/518 X |
| 4,818,624 | 4/1989 | Downey, Jr. | 428/518 |

FOREIGN PATENT DOCUMENTS 968689  6/1975  Canada .
3605405  2/1986  Fed. Rep. of Germany .

OTHER PUBLICATIONS

"UCARSIL®PA-1 Processing Aid for Extrusion Grade Polyolefins" by W. A. Fraser & W. B. Herdle, of Union Carbide Corporation, Specialty Chemicals Division, Tarrytown, N.Y., 10591.

Primary Examiner—P. C. Sluby
Attorney, Agent, or Firm—John J. Toney; William D. Lee, Jr.; Jennifer L. Skord

[57] ABSTRACT

This invention relates to films made from vinylidene chloride copolymers. Specifically, this invention relates to a method and compositions for lowering the oxygen permeability and enhancing the thermal stability and enhancing the melt shear stability of monolayer and multilayer packaging films having a layer of vinylidene chloride copolymer film by adding an organic silicon polymer to the vinylidene chloride copolymer. The conventional stabilizer/plasticizer combination of epoxy resin and 2-ethyl-hexyl diphenyl phosphate may be eliminated from the vinylidene chloride copolymer.

8 Claims, No Drawings

EXTRUDED VINYLIDENE CHLORIDE COPOLYMER FLEXIBLE PACKAGING FILM

BACKGROUND OF THE INVENTION

Flexible thermoplastic packaging films made of vinylidene chloride copolymer, hereinafter referred to generally as PVDC (such materials are also commonly known as "saran", which, in the United States has become generic and is not a registered trademark) have been used for a long time to package food products which include cheese, fresh and processed meats, and a wide variety of other food and nonfood items.

A method of producing a multilayer film having a PVDC layer is disclosed in U.S. Pat, No. 4,112,181, issued on Sept. 5, 1978 to Baird, Jr. et al. This patent describes a method of coextruding a tubular film wherein the walls of the tube have at least three layers, a center layer being a PVDC layer. The tubular film is subsequently biaxially oriented by the trapped bubble technique.

Another satisfactory method of producing a multilayer saran film is disclosed in U.S. Pat. No. 3,741,253, issued on June 26, 1973 to Brax et al, which discloses a multilayer, biaxially oriented film having a saran barrier layer. This film is made by an extrusion coating process in which a substrate layer or layers of a polymer such as polyethylene or ethylene vinyl acetate copolymer is extruded in the form of a tube, cross-linked by irradiation, and inflated. A layer of saran is extrusion coated onto the inflated tubing, and another layer or layers of polymer is simultaneously or sequentially extrusion coated onto the saran. After cooling, this multilayer tubular structure is flattened and rolled up. Then, the tube is inflated, and heated to its orientation temperature, thereby biaxially orienting the film. The bubble is rapidly cooled to set the orientation. This process produces a heat shrinkable barrier film with low oxygen permeability. Also, the advantages of a cross-linked film are provided without subjecting the saran layer to irradiation which tends to degrade saran. The barrier layer in the examples of the patent to Brax et al is a plasticized copolymer of vinylidene chloride and vinyl chloride.

It is standard practice that for PVDC to be successfully extruded at commercial rates, the vinylidene chloride copolymers must be stabilized and plasticized. A successful plasticizer-stabilizer combination is the liquid stabilizer, epichlorohydrin/bisphenol A, an epoxy resin sold as EPON resin 828 by the Shell Chemical Company, and the plasticizer, 2-ethyl hexyl diphenyl phosphate sold as Santicizer-141 by Monsanto Chemical Co. Other known liquid stabilizers include epoxy compounds such as epoxidized linseed oil and epoxidized soybean oil and citrates. A quite successful and satisfactory plasticizer/stabilizer package is made using approximately 4% of Epon 828 and approximately 2% of Santicizer-141 in PVDC. For clarity, it is noted that sometimes the art refers to the epoxy compounds as plasticizers instead of as stabilizers.

In Canadian Pat. No. 968,689, issued on June 5, 1975 to Gillio-tos et al, the effect of plasticizers such as dibutyl sebacate on the barrier properties of a saran barrier layer in a multilayer thermoplastic packaging film is described. First, the Gillio-tos et al patent discloses that homopolymers of vinylidene chloride cannot be converted into film by conventional extrusion techniques because they decompose very rapidly at the temperature of extrusion. Second, by copolymerizing vinylidene chloride with minor amounts of one or more other monomers such as vinyl chloride, methyl acrylate, etc. it is possible to produce copolymers which, when mixed with suitable plasticizers, can be extruded into films which can be oriented by stretching to give heat shrinkable film. The oriented, heat shrinkable, PVDC films are widely used for packaging purposes, particularly for packaging food. As stated in Gillio-tos et al, vinylidene chloride copolymers need to be plasticized so that they can be extruded and stretched into oriented films at commercial rates. The greater the proportion of plasticizer, the lower the viscosity and the easier the polymer is to extrude and orient and the better the abuse resistance of the final product. On the other hand, the oxygen permeability of the final product also increases with increasing plasticizer content and for many purposes, especially packaging food, it is vital that the oxygen permeability is low. In recent years, the packaging industry has become increasingly demanding and for current commercial practices permeability below 100 cc.mil thickness/24 hours/m$^2$/ atmosphere at room temperature is expected and a permeability below 50 is highly desirable. The test for oxygen transmission is conducted as per ASTM D3985.

Of interest is U.S. Pat. No. 4,714,638 (Dec. 22, 1987) to Lustig et al assignors to Viskase. This patent discloses heat-shrinkable, biaxially stretched multi-layer film having a barrier layer of PVDC wherein the comonomer of the PVDC is methyl acrylate in an amount of 5 to 15% by weight. This patent discusses using conventional plasticizers for the PVDC-MA, such as dibutyl sebacate or epoxidized soybean oil.

Also of interest is U.S. Pat. No. 4,320,175 issued Mar. 16, 1982 to Hisazumi et al assignors to Kureha, which shows a PVDC layer composed of PVDC of 0.030 to 0.050 reduced viscosity heat-pressure laminated to a PVDC layer composed of PVDC of 0.050 to 0.075 reduced viscosity. Epoxy compounds are used as stabilizers for the PVDC.

Also of interest are the following patents which show various additives for PVDC. U.S. Pat. No. 4,401,788, issued Aug. 30, 1983 to Hiyoshi et al, assignors to Asahi Dow, shows a PVDC latex with an anionic surfactant, a nonionic surfactant, and a catonic surfactant. U.S. Pat. No. 4,360,612, issued Nov. 23, 1982 to Trumbull et al, assignors to Dow, shows extruded PVDC film containing an alkali metal salt of an alkylaryl sulfonic acid. U.S. Pat. No. 4,418,168, issued Nov. 29, 1983 to Johnson, assignor to Dow, shows stabilizing particulate PVDC by coating thereon a dispersion of tetrasodium pyrophosphate (TSPP) in liquid plasticizer such as epoxidized soybean oil and epoxidized linseed oil. U.S. Pat. Nos. 2,205,449, issued June 25, 1940 and 2,320,112, issued May 25, 1943, both to Wiley, assignor to Dow show PVDC plasticized with phenoxypropylene oxide (lines 48–49, column 1 of '449) and PVDC plasticized with di-(alpha-phenyl-ethyl) ether (line 16, column 2 of '112). German No. 3,605,405, priority Feb. 20, 1986, published Dec. 12, 1987, shows 5-layer films with a PVDC core layer, wherein the EVA adhesion layers on each side of the PVDC core layer contain TSPP to heat stabilize the PVDC core layer. U.S. Pat. No. 3,524,795, issued Aug. 18, 1970 to Peterson, assignor to Dow, shows multiple layer PVDC films and mentions at lines 55–59 of column 4 typical plasticizers for PVDC being acetal tributyl citrate, epoxidized soybean oil, and dibutyl sebacate.

Among the plasticizers for thermoplastics which are listed in general articles and in literature references is glycerol or glycerin. Glycerin together with the above-mentioned epoxy resins as a plasticizer combination for PVDC is disclosed in U.S. Pat. No. 4,686,148 to Havens.

An object of the present invention is to provide a vinylidene chloride copolymer composition which can be extruded with reduced plasticizer and/or stabilizer content or no plasticizer and/or stabilizer, and hence, lowered and improved oxygen permeability.

By lowering the oxygen and gas permeability, the thickness of a saran barrier layer is reduced and, hence, the quantity of saran required for a barrier film is reduced. Since the thickness of saran layers can be reduced, it is another object of the present invention to provide a film wherein the saran layer is thick enough to be an effective gas barrier but thin enough so that it is not adversely affected to any significant extent by electron beam irradiation used to cross-link layers which are cross-linkable and present in addition to the saran layer in a multilayer film. Thus the multilayer films containing a saran layer can be post irradiated with no or minimal discoloration to the saran layer.

Still another object of the present invention is to improve the thermal stability of vinylidene chloride copolymers and to lessen their tendency to degrade while being extruded, and hence provide improved melt shear stability. An advantage is that high viscosity saran or blends of high viscosity saran with low viscosity saran will have a good thermal stability. High viscosity PVDC with an apparent viscosity of about 15000 or more poise at 165° C. 148 sec$^{-1}$ can be employed and yet a thermal stability comparable to that of a lower viscosity PVDC with an apparent viscosity of about 10000 or less poise at 165° C. 148 sec$^{-1}$ is observed.

SUMMARY OF INVENTION

The present invention provides for an extrudable vinylidene chloride polymeric composition comprising:
(a) about 0.1% to 2% by weight of organic silicon polymer, and
(b) at least one vinylidene chloride copolymer wherein the major portion of the copolymer is vinylidene chloride.

The present invention also provides for a multilayer polymeric film comprising:
(a) first and second layers; and
(b) a barrier layer disposed between said first and second layers, said barrier layer comprising
　(1) about 0.1% to 2% organic silicon polymer by weight, and
　(2) at least one vinylidene chloride copolymer wherein the major portion of the copolymer is vinylidene chloride.

Optionally, this multilayer film may be irradiated by electron beam at a dosage of about 0.5 to about 6.0 MR with minimal or no discoloration to the vinylidene chloride copolymer layer. Also, the vinylidene chloride copolymer may be free of conventional epoxy liquid stabilizer.

DETAILED DESCRIPTION

It has been surprisingly discovered that the addition of organic silicon polymer provides several improvements to extrusion of vinylidene chloride copolymers and films produced thereby. The enhanced thermal stability allows reduction of conventional plasticizers/stabilizers, the reduction of which improves oxygen barrier properties. Furthermore, the improved thermal stability results in generation of less shear heat during processing which leads to less vinylidene chloride copolymer degradation. This allows reduction or modification of the additives normally required to prevent heat-induced degradation which, in turn, can lead to further oxygen barrier improvements. Also, an increase in thermal stability is directly related to an increase in melt shear stability. Therefore, the sum of these effects permits extrusion speeds and orientation rates to be maintained with improvements in oxygen barrier properties. An added advantage is that polymeric organic silicons do not eat away the metal extruder like glycerol does.

It is known that if a multilayer film containing a saran layer is electron beam irradiated, the saran tends to darken and degrade. Another benefit of the improved barrier characteristics resulting from the present invention is that when a thinner saran barrier layer is used there is less saran to expose to radiation if an irradiation cross-linked multilayer film is desired. Since with the present invention the mass of saran exposed to irradiation is reduced, numerous cross-linked film combinations are available which were not heretofore feasible.

Common methods for determining overall thermal stability for extrusion of vinylidene chloride copolymer blends with additives such as plasticizers and stabilizers involve working the blend between a pair of heated rollers or inside a heated mixing chamber. The time required for shear and temperature-induced degradation to produce a noticeably blackened polymer is a measure of effectiveness of additives such as a plasticizer/stabilizer combination in promoting heat stability. Commercially acceptable vinylidene chloride copolymer additive combinations should show thermal stability times of 10–15 minutes or better in a mixing chamber such as a Brabender blender at 300° F. (149° C.).

It has been unexpectedly found that the addition of approximately 0.5% by weight of organic silicon polymer to a blend of 4% by weight of EPON 828 and 2% by weight Santicizer 141 (total 6%) increases thermal stability from around 20 minutes to 40 minutes. Addition of only 0.2% by weight of organic silicon polymer allows reduction of EPON 828 and Santicizer 141 from 6% total down to 5% total with retention of around 20 minutes thermal stability. Furthermore, addition of 1% by weight of organic silicon polymer allows reduction of EPON 828 and Santicizer 141 down to 3 to 4% by weight total and with the improvement of 26+ minute thermal stability. The EPON 828 and Santicizer 141, in some instances, may even be eliminated.

Thus, in one aspect, the present invention is an extrudable vinylidene chloride polymeric composition comprising by weight 0% to 4.0% epichlorohydrin/bisphenol A epoxy resin, 0% to 4.0% 2-ethyl-hexyl-diphenyl-phosphate, and about 0.01% to 2.0%, preferably about 0.1% to 1.2%, more preferably about 0.2% to 1.0%, organic silicon polymer, with the balance being one or more vinylidene chloride copolymers. Alternative expoxidized resins are epoxidized linseed oil and expoxidized soybean oil which may be included in quantities up to about 6% by weight.

In another aspect, the present invention is a multilayer polymeric film comprising first and second polymeric layers with a vinylidene chloride copolymer layer disposed between said polymeric layers in which the vinylidene chloride copolymer layer includes organic silicon polymer as specified above. Also, (a) a film layer may be irradiated followed by extrusion coating the PVDC and another film layer followed by electron beam irradiation of the entire multilayer film, or (b) the multilayer film may be coextruded followed by electron beam irradiation of the entire multilayer film. Optionally, the multilayer film may be stretch oriented to make it heat shrinkable either before or after irradiation.

Irradiation of the entire multilayer film or a layer thereof may be accomplished by the use of high energy electrons. Preferably, electrons are employed up to about 6 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 6 MR, typically between about 0.5 MR and about 6.0 MR, with a preferred dosage range of about 1 MR to about 4 MR. Irradiation can be carried out conveniently at room temperature, although higher and lower temperatures, for example, 0° C. to 60° C. may be employed.

In still another aspect, the present invention is a method of lowering the oxygen permeability and improving the thermal stability of a vinylidene chloride copolymer film comprising the steps of preparing a mixture comprising a vinylidene chloride copolymer and about 0.01% to 2%, preferably about 0.1% to 1.2%, by weight organic silicon polymer, blending said mixture; and thereafter extruding a film from the mixture. More preferably, the organic silicon polymer is present as 0.2% to 1.0% by weight.

In a further aspect the foregoing blends may include 2-ethyl hexyl diphenyl phosphate and/or tetrasodium pyrophosphate, oxidized polyethylene and/or antioxidant magnesium oxide, epoxidized linseed oil, epoxidized soybean oil and other plasticizers. Still other aspects of the present invention include irradiation of a multilayer film, which has organic silicon polymer in the saran layer as specified above, to cross-link the cross-linkable layers. Such cross-linkable layers may be surface layers or internal layers in addition to the saran layer and are preferably polyolefins selected from the group consisting of ethylene-vinyl acetate copolymer (EVA), branched polyethylene (PE), linear low density and very low density polyethylene (LLDPE and VLDPE), low density polyethylene (LDPE), ethylene-butyl acrylate copolymer (EBA), ethylene-propylene copolymer (EPC), and blends thereof.

In the aforementioned Gillio-tos et al patent it was disclosed that a relatively high plasticizer-stabilizer content is required in the saran barrier layer in order that orientation and extrusion can be performed at commercial rates. The examples in the Gillio-tos patent disclose plasticizer in the range from 7 to 12% by weight for this purpose. In the Brax et al patent the lowest mentioned plasticizer-stabilizer content is 2% Epon (an epoxy resin) combined with 2% Santicizer-141 (ethyl-hexyl-diphenyl-phosphate) in Example III. In the claims of Brax et al, the claimed range for inclusion of an epoxy resin is in claim 3 wherein a range from 2% to 10% by weight is set forth. By contrast, it has been discovered that the epoxy content and/or the ethylhexyl-diphenyl-phosphate content may be lowered or even eliminated when polymeric organic silicon is employed. This is quite unexpected as in present commercial film produced according to the Brax et al process, the optimum balance between extrudability, orientation, and barrier properties is obtained with about 4% .Epon-content and about 2% Santicizer-141 content.

Any polymeric organic silicon or mixtures thereof may be employed in the present invention. Preferred ones include, but are not limited to, the polysiloxanes. Preferred polysiloxanes are polydimethyl siloxane, polydimethyldiphenyl siloxane, and polymethyl alkyl aryl siloxane.

A very preferred organic silicon is organo modified polydimethyl silicon sold by Union Carbide as UCARSIL® PA-1. This is described in a sales brochure entitled "UCARSIL® PA-1 Processing Aid For Extrusion Grade Polyolefins" by W. A. Fraser and W. B. Herdle, of Union Carbide Corporation, Speciality Chemicals Division, Tarrytown, N.Y., 10591.

DEFINITIONS

As used herein, the following terms are understood to have the meaning set forth below:

"Polymer" means the product of polymerization and includes but is not limited to homopolymers, monopolymers, copolymers, interpolymers, terpolymers, block copolymers, graft copolymers, and addition copolymers.

"Plasticizer" means a substance or material incorporated in a film or film layer to increase the flexibility, workability, or extrudability of the film. These substances include both monomeric plasticizers and polymeric plasticizers and are generally those materials which function by reducing the normal intermolecular forces in a resin thus permitting the macromolecules to slide over one another more freely.

"Oriented" or "Orientation" refer to the process of stretching a hot plastic article followed by rapidly cooling while in the stretched condition to realign a molecular configuration thus improving mechanical properties. Stretching in one direction is called uniaxial orientation and in two directions is called biaxial orientation. In thermoplastic flexible films which have been oriented there is an internal stress remaining in the plastic sheet which can be relieved by reheating the sheet to a temperature above that at which it was oriented. The material will then tend to shrink back to the original dimensions it had before it was stretch oriented. Thus "oriented" flexible films are "heat-shrinkable" flexible films, and the terms "oriented" and "heat-shrinkable" are used interchangably herein.

An "oriented" or "heat shrinkable" material is defined herein as a material which, when heated to an appropriate temperature above room temperature (for example 96° C.), will have a free shrink of about 5% or greater in at least one linear direction, as per ASTM D 2732.

"Vinylidene chloride polymer" or "vinylidene chloride copolymer" or "saran" or "PVDC" means vinylidene chloride copolymerized with at least one other monomer which includes, but is not limited to, vinyl chloride, $C_1$ to $C_8$ alkyl acrylates (such as methyl acrylate), $C_1$ to $C_8$ alkyl methacrylates and acrylonitrile. As abbreviations employed here, PVDC is used to designate copolymers of vinylidene chloride, PVDC-MA designates vinylidene chloride/methyl acrylate copolymer and PVDC-VCl designates vinylidene chloride/vinyl chloride copolymer.

As used herein the term "extrusion" or the term "extruding" is intended to include coextrusion, extrusion coating, or combinations thereof, whether by tubular methods, planar methods, or combinations thereof.

"Barrier" refers to a property in thermoplastic materials which indicates that the particular material has a very low permeability to gases, such as oxygen. The principal barrier materials referred to herein are the vinylidene chloride copolymers designated as "PVDC". Other known barrier materials are hydrolyzed ethylene-vinyl acetate copolymers designated by the abbreviations: "EVAL" or "EVOH" or "HEVA", and the inventive film may optionally have one or more layers comprising EVOH.

"Organo" or "Organic" means a compound containing carbon atoms in the molecule.

"Silicon" means a compound containing silicon atoms in the molecule.

"Siloxane" means a compound containing both silicon atoms and oxygen atoms in the molecule.

| MATERIALS EMPLOYED IN EXAMPLES | |
|---|---|
| Designation | Description |
| PVDC-MA | A copolymer of vinylidene chloride with methyl acrylate sold by Dow Chemical Company as XU 32027.01. It is about 91.5% VDC and about 8.5% MA by weight. It has a high apparent viscosity of about 19000 poise at 165° C. 148 sec$^{-1}$. |
| PVDC-VCl | A copolymer of vinylidene chloride with vinyl chloride of low apparent viscosity of about 7800 poise at 165° C. sec$^{-1}$ sold by Solvay as PV864. |
| PLAST | A plasticizer, 2-ethyl-hexyl-diphenyl-phosphate, sold by Monsanto as Santicizer 141. |
| STAB | A liquid stabilizer, epichlorohydrin/bisphenol A, an epoxy resin sold by Shell as Epon 828. |
| TSPP | Tetrasodium pyrophosphate sold by Monsanto. It is a solid stabilizer. |
| Oxidized PE | Oxidized polyethylene sold by Allied as AC 629 A. |
| Antioxidant | Sold by Ciba Geigy as Irganox 1010. |
| DMS | Organo modified polydimethyl silicon, a polysiloxane sold by Union Carbide as UCARSIL ® PA-1, as a processing aid for LDPE or LLDPE. |

EXAMPLE I

Samples of PVDC were mixed with stabilizer, plasticizer, and/or DMS in a Brabender Plastigraph mixing chamber at 300° F. (149° C.). The thermal stability was determined by measuring the time within which the blend noticeably darkened. (For samples 1, 2 and 3, a second blend was timed for darkening, and thus two times are noted in the Table.) The results are summarized in Table I below.

TABLE I

| SAMPLE | INGREDIENTS (WEIGHT %) | | | | THERMAL STABILITY (MINUTES) |
|---|---|---|---|---|---|
| | PVDC | PLAST | STAB | DMS | |
| 1 Control | PVDC-MA 94 | 2 | 4 | 0 | 20,18 |
| 2 | PVDC-MA 93.8 | 2 | 4 | 0.2 | 18,20 |
| 3 | PVDC-MA 94.8 | 2 | 3 | 0.2 | 22,18 |

TABLE I-continued

| SAMPLE | INGREDIENTS (WEIGHT %) | | | | THERMAL STABILITY (MINUTES) |
|---|---|---|---|---|---|
| | PVDC | PLAST | STAB | DMS | |
| 4 | PVDC-MA 94.8 | 1 | 4 | 0.2 | 18 |
| 5 | PVDC-MA 93.5 | 2 | 4 | 0.5 | 40 |
| 6 | PVDC-MA 95 | 2 | 2 | 1 | 28 |
| 7 | PVDC-MA 96 | 0 | 3 | 1 | 30 |
| 8 | PVDC-MA 96 | 3 | 0 | 1 | 26 |

As can be seen from samples 2–4, with addition of as little as 0.2% DMS, the plasticizer/stabilizer content could be decreased from 6% (sample 2) to 5% (samples 3 and 4), yet the thermal stability was maintained around 20 minutes, the same time as control sample 1 which had 6% plasticizer/stabilizer but no DMS.

As can be seen from sample 5, increasing to 0.5% DMS as compared to 0.2% DMS (samples 2–4) with a plasticizer/stabilizer content of 5–6% doubled the thermal stability from around 20 minutes (samples 2–4) to 40 minutes (sample 5).

As can be seen from sample 6, by increasing the amount of DMS to 1% as compared to 0.2% (samples 2–4), the plasticizer/stabilizer content was decreased from the 5–6% level (samples 2–4) to 4% (sample 6) but the thermal stability increased from around 20 minutes (samples 2–4) to 28 minutes (sample 6). Also at 1% DMS, one or the other of plasticizer or stabilizer could be left out with the remaining one being only 3% (samples 7 and 8) yet the thermal stability increased to 30 minutes (sample 7) and 26 minutes (sample 8), as compared to control sample 1 which had 6% total plasticizer/stabilizer and no DMS and exhibited a thermal stability around 20 minutes.

EXAMPLE II

More PVDC samples were made as described in Example I with plasticizer and DMS, but this time instead of the liquid stabilizer Epon, TSPP was added. The results are summarized in Table II below.

TABLE II

| SAMPLE | Ingredients (Weight %) | | | | THERMAL STABILITY (MINUTES) |
|---|---|---|---|---|---|
| | PVDC | PLAST | TSPP | DMS | |
| 1 | PVDC-MA 96 | 3 | 0.5 | 0.5 | 28 |
| 2 | PVDC-MA 96.5 | 2 | 0.5 | 1 | 36 |
| 3 | PVDC-MA 95.5 | 3 | 0.5 | 1 | 40 |

By comparing sample 1 of Table II with sample 8 of Table I, it can be seen that the amount of DMS could be decreased (0.5%) when DMS was used with TSPP in plasticized PVDC-MA, and the thermal stability was maintained at 28 minutes (sample 1, Table II) which is a time similar to when increased DMS (1%) was used with plasticizer in PVDC-MA and the thermal stability was 26 minutes (sample 8, Table I).

EXAMPLE III

More PVDC samples were made as described in Examples I and II, but this time there was no liquid stabilizer and no plasticizer. This time in addition to DMS, TSPP and antioxidant were added. The DMS, TSPP and antioxidant were added in the same amounts to the PVDC. However, in some samples some of the PVDC-MA was substituted with PVDC-VCl. The results are summarized in Table III below.

TABLE III

| SAMPLE | INGREDIENTS (WEIGHT %) | | | | THERMAL STABILITY (MINUTES) |
|---|---|---|---|---|---|
| | PVDC | TSPP | ANTIOXIDANT | DMS | |
| 1 | PVDC-MA 97.35 | 2 | 0.15 | 0.5 | 36 |
| 2 | PVDC-MA 72.35 PVDC-VCl 25 | 2 | 0.15 | 0.5 | 36 |
| 3 | PVDC-MA 47.35 PVDC-VCl 50 | 2 | 0.15 | 0.5 | 72 |
| 4 | PVDC-MA 22.35 PVDC-VCl 75 | 2 | 0.15 | 0.5 | 64 |

First of all, by comparing samples 1 and 2 of Table III with any of the samples from Tables I and II, it can be seen that use of a small amount (0.15) of antioxidant with the DMS and TSPP achieved excellent thermal stability (time of 36 minutes) without the use of plasticizer and liquid stabilizer.

Secondly, by comparing samples 3 and 4 of Table III with samples 1 and 2 of Table III, it can be seen that an increase in thermal stability to 72 and 64 minutes was achieved when the amount of PVDC-MA was brought under 50% and replaced with PVDC-VCl. Replacing the PVDC-MA with PVDC-VCl was expected to cause an increase in thermal stability, as it is known that the lower the viscosity of a saran the more stable it is. The particular PVDC-VCl used has a lower viscosity than the particular PVDC-MA used. Thus from the excellent thermal stability of samples 3 and 4, it is stressed that a low viscosity saran can be blended with a high viscosity saran in a weight % amount up to about 50% high viscosity saran and still the blend will have a thermal stability expected of a low viscosity saran.

EXAMPLE IV

As stated in the paragraph above, low viscosity saran has better thermal stability than high viscosity saran. Thus, it was desired to see if DMS would further improve this already good thermal stability of low viscosity saran. Thus, more samples were made as in Example III, but using PVDC-VCl instead of blends of PVDC-MA with PVDC-VCl. No liquid stabilizer and no plasticizer were used. First, TSPP, antioxidant and oxidized PE were added to PVDC-VCl. Next a similar mixture of PVDC-VCl, TSPP, antioxidant, and oxidized PE was prepared but also containing a small amount (0.2 wt. %) of DMS. The results are summarized in Table IV below.

TABLE IV

| SAMPLE | INGREDIENTS (WEIGHT %) | | | | | THERMAL STABILITY (MINUTES) |
|---|---|---|---|---|---|---|
| | PVDC | TSPP | ANTI- OXIDANT | OXIDIZED PE | DMS | |
| 1 | PVDC-VCl 97.6 | 2 | 0.2 | 0.2 | 0 | 70 |
| 2 | PVDC-VCl 97.4 | 2 | 0.2 | 0.2 | 0.2 | 90 |

Further improvement from a thermal stability of 70 minutes to a thermal stability 90 minutes was obtained by adding DMS, to the PVDC-VCl. Therefore, addition of DMS to low viscosity saran further improved the already good thermal stability.

EXAMPLE V

It was desired to see if some of the PVDC-VCl (sample 2 of Table IV) could be replaced with PVDC-MA, yet maintain good thermal stability. Thus, more samples were made as in Example IV, sample 2, with the same amount of TSPP, antioxidant, oxidized PE, and DMS, but some of the PVDC-VCl was replaced with PVDC-MA. The results are summarized in Table V below.

TABLE V

| SAMPLE | INGREDIENTS (WEIGHT %) | | | | | THERMAL STABILITY (MINUTES) |
|---|---|---|---|---|---|---|
| | PVDC | TSPP | ANTI- OXIDANT | OXIDIZED PE | DMS | |
| 1 | PVDC-VCl 87.4 PVDC-MA 10 | 2 | 0.2 | 0.2 | 0.2 | 80 |
| 2 | PVDC-VCl 77.4 PVDC-MA | 2 | 0.2 | 0.2 | 0.2 | 60 |

TABLE V-continued

| SAMPLE | INGREDIENTS (WEIGHT %) | | | | | THERMAL STABILITY (MINUTES) |
|---|---|---|---|---|---|---|
| | PVDC | TSPP | ANTI-OXIDANT | OXIDIZED PE | DMS | |
| | 20 | | | | | |

By comparing sample 1 of Table V with sample 1 of Table IV, it can be seen that the presence of DMS (sample 1, Table V) not only allowed for the replacement of some PVDC-VCl with 10% PVDC-MA, but also improved the thermal stability to 80 minutes (sample 1, Table V) versus 70 minutes (sample 1 of Table IV).

Furthermore, from sample 2 of Table V, it can be seen that even with replacement of some PVDC-VCl with as much as 20% PVDC-MA, an excellent 60 minute thermal stability was still maintained.

In summary of all the above Examples, DMS in PVDC allowed for reduction of the conventional plasticizer/liquid stabilizer combination of Santicizer 141/Epon 828, or one or the other could be eliminated. Both could be eliminated when DMS was used together with TSPP in PVDC, and even further stability was obtained when DMS was used together with both oxidized PE and TSPP in PVDC. Also when DMS was used, a higher viscosity PVDC could be employed and yet a thermal stability comparable to that of a lower viscosity PVDC was observed.

EXAMPLE VI (Films)

Multilayer films containing a barrier layer were coextruded. The barrier layer was 97.6% PVDC-VCl, 2% TSPP, 0.2% Irganox antioxidant, and 0.2% DMS. As indicated, the multilayer films were sometimes corona laminated or thermally laminated to another multilayer film, to fabric or to styrofoam. The following films were made:

| SAMPLE 1 (Web for Packaging Beef) | |
|---|---|
| Layer* | Ingredients |
| 1 | EPC |
| 2 | EVA |
| 3 | EVA |
| Corona | |
| 4 | EVA |
| 5 | EVA |
| 6 | Barrier |
| 7 | EVA |
| 8 | EVA |
| Corona | |
| 9 | EVA |
| 10 | EVA |
| 11 | Barrier |
| 12 | EPC |
| 13 | EVA |
| Corona | |
| 14 | EVA |
| 15 | 90% EVA and 10% Mineral Oil |
| 16 | EVA |

*Multilayer films 1/2/3 and 14/15/16 were irradiated by electron beam at 9 MR and 6 MR, respectively, prior to corona bonding for lamination to the other multilayer films.

| SAMPLE 2 (Stretch-barrier film) | |
|---|---|
| Layer | Ingredients |
| 1 | Nylon |

-continued

| SAMPLE 2 (Stretch-barrier film) | |
|---|---|
| Layer | Ingredients |
| 2 | Adhesive |
| 3 | 80% EVA and 20% red color concentrate |
| 4 | EVA |
| 5 | Barrier |
| 6 | 95% EVA and 5% Antifog agent |
| 7 | 95% EVA and 5% Antifog agent |

| SAMPLE 3 (Foam tray) | |
|---|---|
| Layer | Ingredients |
| 1 | LLDPE |
| 2 | EVA |
| 3 | Barrier |
| 4 | 80% EVA and 20% antiblock concentrate |
| thermal | |
| 5 | Styrofoam, 100 mil (0.25 cm) |
| thermal | |
| 6 | 80% EVA and 20% antiblock concentrate |
| 7 | EVA |
| 8 | Barrier |
| 9 | EVA |
| 10 | LLDPE |

| SAMPLE 4 (bag for high acid/hot fill food product) | |
|---|---|
| Layer | Ingredients |
| 1 | 90% LLDPE and 10% antiblock concentrate |
| 2 | EVA |
| 3 | Barrier |
| 4 | EVA |
| 5 | EVA |
| 6 | Adhesive |
| 7 | Nylon |

| SAMPLE 5 (Lidding film) | |
|---|---|
| Layer | Ingredients |
| 1 | Polypropylene, oriented & heat set |
| Corona | |
| 2 | EVA |
| 3 | LLDPE |
| 4 | Adhesive |
| 5 | EVOH |
| 6 | Adhesive |
| 7 | LLDPE |
| 8 | EVA |
| Corona | |
| 9 | EVA |
| 10 | LLDPE |
| 11 | EVA |
| 12 | EVA |
| 13 | Barrier |
| 14 | 50% EVA with antifog additives and 50% EVA |
| 15 | Melthene M 1352 |

These samples 1-5 illustrate that PVDC films wherein the PVDC was free of the conventional plasticizer/stabilizer combination of Epon 828/Santicizer 141 were successfully extruded.

EXAMPLE VII

A 3-layer film is coextruded as per the process described in Baird et al U.S. Pat. No. 4,112,181 having the structure EVA/PVDC-MA/EVA wherein the PVDC-MA core layer contains by weight 2% TSPP, 0.2% antioxidant Irganox 1010 from Ciba Geigy, 0.2% oxidized polyethylene AC 629A from Allied, and 0.2% UCARSIL PA-1 from Union Carbide (DMS). The film is biaxially stretch oriented and then electron beam irradiated at 1 MR. The before orientation thickness of the PVDC layer is about 2.5 mils, whereas prior art films are typically made with a PVDC layer having a 3.5 mil before-orientation thickness. The saran layer should exhibit excellent melt shear stability during extrusion and minimal discoloration after irradiation.

EXAMPLE VIII

The process of Example VII is repeated except this time PVDC-VCl is used instead of PVDC-MA.

While certain representative embodiments and details have been shown for the purpose of illustration, numerous modifications to the formulations described above can be made without departing from the invention disclosed.

What is claimed is:

1. A multilayer, extruded, polymeric film comprising:
   (a) first and second polymeric film layers; and
   (b) a barrier layer disposed between said first and second layers, said barrier layer consisting essentially of a blend of
      (1) about 0.01% to 2% organic silicon polymer by weight, and
      (2) at least one vinylidene chloride copolymer wherein the major portion is vinylidene chloride.

2. The film of claim 1 wherein the silicon polymer comprises polysiloxane.

3. The film of claim 1 wherein the vinylidene chloride layer includes stabilizer content in the range of about 0.1% to 4.0% by weight and wherein the stabilizer is selected from epichlorohydrin/bisphenol A epoxy resin, epoxidized linseed oil, epoxidized soybean oil, or mixtures thereof.

4. The film of claim 1 wherein the vinylidene chloride layer includes by weight an additive selected from about 0.1 to 4.0% tetrasodium pyrophosphate, about 0.1 to 4.0% oxidized polyethylene, about 0.1 to 4.0% antioxidant, about 0.1% to 4.0% 2-ethyl hexyl diphenyl phosphate, or mixtures thereof.

5. The film of claim 1 wherein said multilayer film has been irradiated by electron beam with a dosage of about 0.5 MR to about 6 MR.

6. The film of claim 1 wherein said first and second layers comprise polyolefin materials.

7. The film of claim 6 wherein said polyolefin materials are selected from ethylene/vinyl acetate copolymer, low density polyethylene, linear low density polyethylene, linear very low density polyethylene, ethylene/butyl acrylate copolymer, ethylene/propylene copolymer, or mixtures thereof.

8. The film of claim 1 wherein the multilayer film is stretch oriented.

* * * * *